M. C. SCHWEINERT.
PRESSURE GAGE.
APPLICATION FILED MAR. 25, 1916.
1,248,429.
Patented Nov. 27, 1917.
2 SHEETS—SHEET 1.
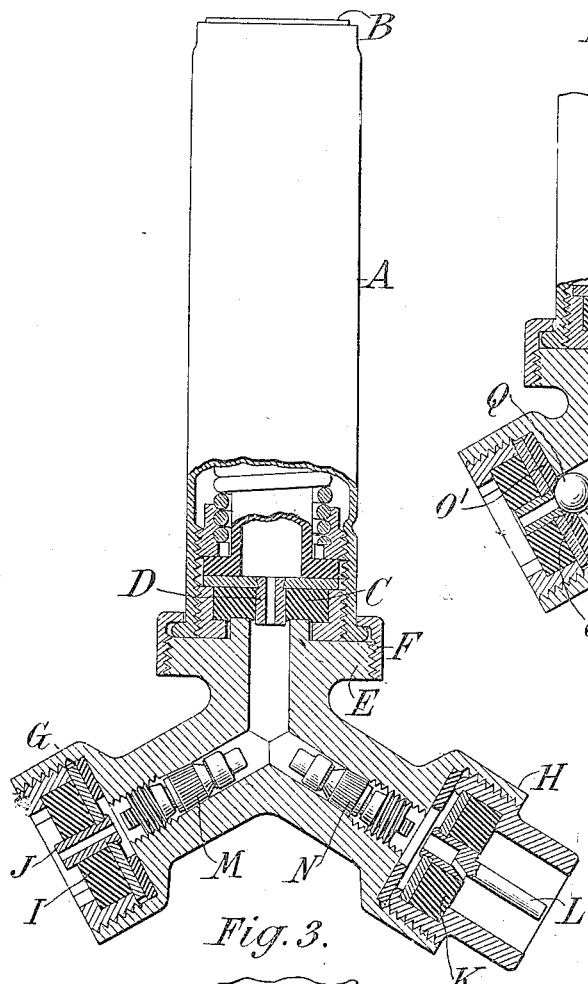
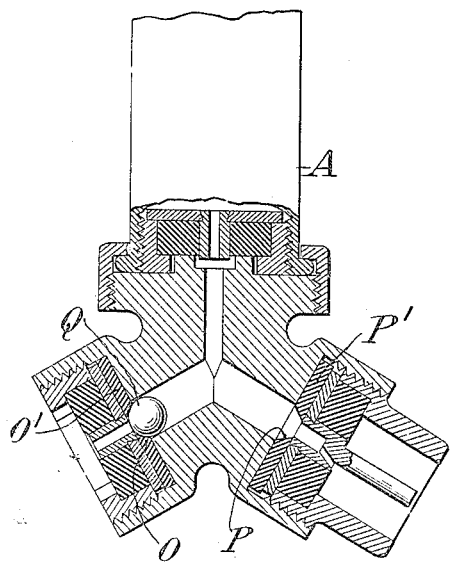
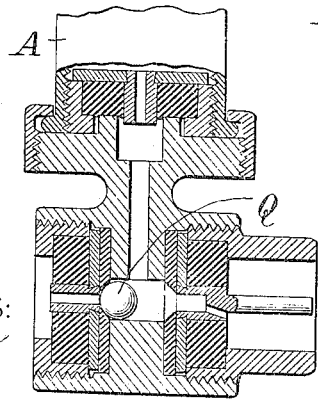
WITNESSES:
René Bruine
J. H. Wallace
INVENTOR :
Maximilian Charles Schweinert
By Attorneys,
Fraser Burk & Myers

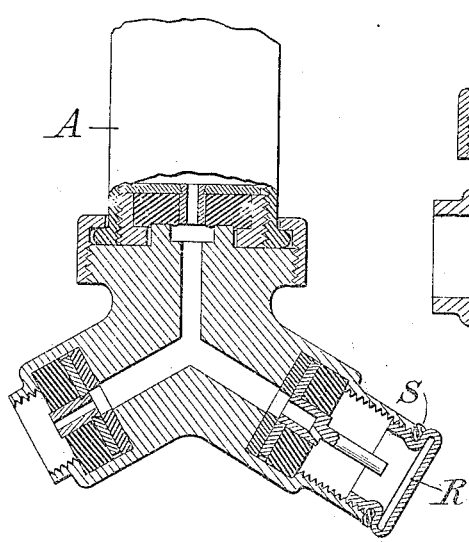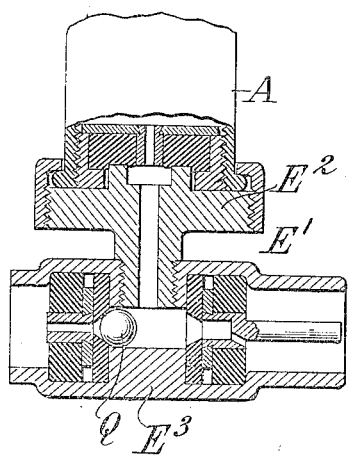

UNITED STATES PATENT OFFICE.

MAXIMILIAN CHARLES SCHWEINERT, OF WEST HOBOKEN, NEW JERSEY.

PRESSURE-GAGE.

1,248,429.

Specification of Letters Patent.

Patented Nov. 27, 1917.

Application filed March 25, 1916. Serial No. 86,684.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Pressure-Gages, of which the following is a specification.

This invention relates to pressure gages, and aims to provide certain improvements therein.

The invention is particularly directed to gages of the pencil type which are adapted to measure the pressures in pneumatic tires or other similar containers. The standard type of pencil gage sold on the American market is adapted to fit only the standard pneumatic tire valve, and when this gage is used in connection with other types of valve, particularly those which are largely used abroad, another form of deflating foot must be employed. Such gages, however, are often required to measure the pressure in tires having different types of valve and to provide for this I have heretofore constructed several forms of gage in which a detachable part is employed, fitting the gage for one or the other types of valve. See application Serial No. 52,455 filed September 24, 1915. According to the present invention I provide a gage which is adapted to be interchangeably used with different types and which does not require any special operation to fit it for such use. Broadly speaking, the invention comprises a gage having two deflating feet, so-called, either of which may be used, and one of which is adapted to fit one type of valve and the other a dissimilar type.

In the drawings which illustrate several forms of the invention,—

Figure 1 is a side elevation of a gage partly in section, illustrating one form of the invention.

Fig. 2 is a similar view of a modified form.

Fig. 3 is a similar view of a still further modification.

Figs. 4 and 5 are similar views of other modifications.

Referring first to Fig. 1, let A indicate the gage casing having an indicating sleeve B adapted to be projected above the top of the casing by the pressure.

The gage is commonly provided with a packing C and deflator D which are adapted to fit the ordinary standard American valve. The foot E provided by the present invention is preferably made separately from the gage and united thereto by a screw coupling F. When the foot portion E is used, the packing C and deflator D may be omitted if desired, although for simplicity it is ordinarily best to connect the complete gage to the foot portion E.

The foot portion E provided by the present invention comprises a member having two feet G and H. One of these, as for instance G, is adapted to fit one type of valve (in the drawing the American type) and the foot H is adapted to fit another type (in the drawing the foreign type). Preferably the foot portion is constructed as a three-branched structure as shown, the middle branch being adapted to receive the coupling F.

The foot G is provided with a packing I and deflator J and the foot H is provided with a packing K and deflator L adapted to fit their respective valves.

According to the invention means are provided for sealing one foot when the other foot is in use, and preferably such means are automatic so that the only action required by the user is to merely press down the appropriate foot over the valve without paying any attention to the other. To this end in Fig. 1 two check valves are employed, one for each foot, such valves being indicated at M and N respectively and comprising a well-known type which need not be described. When air pressure enters either one foot it lifts the valve and enters the gage. The oppositive valve if open is closed by the pressure.

In Fig. 2 the construction is similar except that seats O and P are provided in the respective feet, such seats being preferably formed in packing washers O' and P', and a single ball valve Q is used which automatically closes the foot which is not in use. In Fig. 3 a construction similar to Fig. 2 is employed, the branches being in alinement instead of angularly arranged as in Fig. 2.

Fig. 4 shows a similar construction except that the foot portion E' is formed in two parts E² and E³, which are screwed together as shown, or otherwise united.

In Fig. 5 internal valves are omitted, the foot which is not in use being adapted to be closed by a manually operated valve or cap R provided with a packing S which may be screwed in the end of either foot. In this construction if desired the operator may place his thumb across the opening in the foot which is not in use in order to prevent passage of air therethrough.

While I have shown and described several forms of the invention, it will be understood that I do not wish to be limited thereto since various changes may be made therein without departing from the spirit of the invention.

What I claim is:—

1. A pressure gage having two deflating feet, each connected with the gage and both operable without disconnection.

2. A pressure gage having two deflating feet, each connected with the gage and both operable without disconnection, and valve mechanism for closing one foot while the other is in use.

3. A pressure gage having two deflating feet, each connected with the gage and both operable without disconnection, and automatic valve mechanism for closing one foot while the other is in use.

4. A pressure gage having two deflating feet, each connected with the gage and both operable without disconnection, and a valve for each foot to prevent egress of air therefrom.

5. A pressure gage having two deflating feet, each connected with the gage and both operable without disconnection, and an automatic check valve in each foot for preventing egress of air therefrom.

6. A pressure gage having a three-branched structure, one of which leads to the gage and the other two of which have deflating feet.

7. A pressure gage having a three-branched structure, one of which leads to the gage and the other two of which have deflating feet, and valve mechanism adapted to close one foot while the other is in use.

In witness whereof, I have hereunto signed my name in the presence of two subscribing witnesses.

MAXIMILIAN CHARLES SCHWEINERT.

Witnesses:
  E. V. MYERS,
  T. F. WALLACE.